Nov. 27, 1962 H. BALLAUF 3,065,922

REVERSIBLE MAGNETIC TAPE CARTRIDGE

Filed July 25, 1961

INVENTOR

HEINZ BALLAUF

BY Glascock Downing & Seebold

ATTORNEYS

United States Patent Office 3,065,922
Patented Nov. 27, 1962

3,065,922
REVERSIBLE MAGNETIC TAPE CARTRIDGE

Heinz Ballauf, Bad Nauheim, Germany, assignor to Laux Tonbildschau KG, Frankfurt am Main, Germany
Filed July 25, 1961, Ser. No. 126,627
Claims priority, application Germany Aug. 12, 1960
4 Claims. (Cl. 242—55.13)

This invention relates to sound recording or play back and more particularly to a reversible magnetic tape cartridge which may be utilized in connection with a magnetic tape recorder or play back apparatus.

In the conventional use of tape recorders or play back apparatus, it is customary to supply the magnetic tape wound on a reel and such reel is placed on a feed spindle on the apparatus, while a take-up reel is placed on a take-up spindle. After utilizing a reel of tape, it is necessary to transfer the take-up reel to the feed spindle and invert such reel in order to permit recording on the other half of the tape and this operation also requires threading the tape through the recording or play back head and attaching the end thereof to a take-up reel. While this is satisfactory for certain types of recording or play back, it is sometimes desirable to provide pre-recorded tape or unrecorded tape in the form of a cartridge which may be conveniently inserted in the apparatus with the tape properly positioned in the recording or play back head and in which it is only necessary to invert the cartridge in order to reverse the direction of movement of the tape.

Magazines of this type have heretofore been proposed and utilized and while, to a certain extent, such prior art magazines have been relatively satisfactory and have seemed to serve the purpose desired, nevertheless, some difficulty has been experienced in maintaining proper tension in the tape during operation of the apparatus and also in maintaining such tension during periods of non-use or when the magazine is being transported apart from the recording or play back apparatus which has resulted in the formation of slack in the tape or the formation of loops therein which seriously interfere with the proper positioning of the magazine in the play back or recording apparatus, since for such insertion of the magazine the tape must be accurately aligned with the gap in the recording or play back head and in the event there is excessive slack in the tape, the same tends to be displaced out of alignment with the gap in the head and consequently, proper and rapid insertion of the magazine into the recorder or play back apparatus is rendered difficult. Furthermore, previous attempts to provide and maintain proper tension in the tape have involved the use of braking means on the feed and take-up spindles and no provision has been made in such braking means for changing the effect thereof as the diameter of the tape coil decreases or increases with the result that there is excessive slippage and wear in such breaking means during a portion of the operation of the apparatus for each coil of tape.

It is accordingly an object of the invention to provide a reversible magnetic tape cartridge in which a coil of tape may be placed, the cartridge having means to permit the convenient insertion thereof in a recording or play back apparatus.

A further object of the invention is the provision of a reversible magnetic tape cartridge incorporating means for maintaining the tape under tension, both during periods of use and non-use.

A still further object of the invention is the provision of a reversible magnetic tape cartridge in which means is provided for maintaining tension in the tape and for maintaining the same in proper locations to permit convenient insertion of the cartridge in a recording or play back apparatus with the tape properly positioned in the gap of the recording or play back head.

Another object of the invention is the provision of a reversible magnetic tape cartridge in which means is provided for maintaining tension in the tape during transfer thereof from a feed spindle to a take-up spindle, such tension being maintained by a braking mechanism the effect of which is automatically varied in accordance with the diameter with the feed coil, as well as the diameter of the take-up coil.

Further objects and advantages of the invention will be apparent from the following description taken in conjunction with the accompanying drawings wherein.

Figure 1:
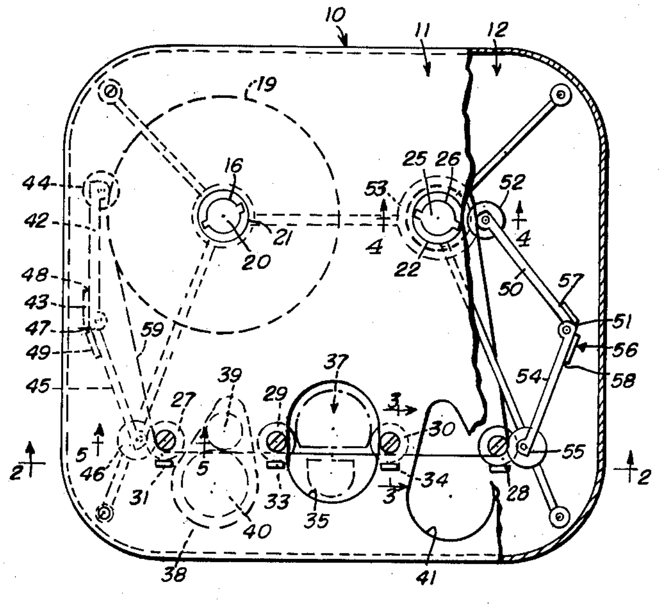
FIG. 1 is a top plan view of a reversible magnetic tape cartridge constructed in accordance with this invention and with parts broken away and in section for greater clarity.
Figure 3:
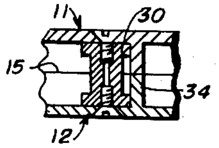
Figure 4:
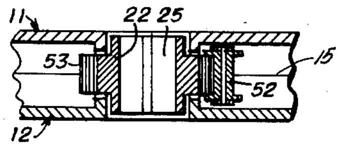
Figure 5:
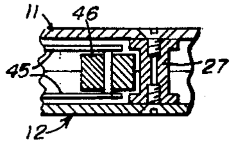

FIG. 3 a fragmentary sectional view taken substantially on the line 3—3 of FIG. 1 showing one of the tape guide means and the view being on an enlarged scale;

FIG. 4 a fragmentary sectional view taken substantially on the line 4—4 of FIG. 1 showing the take-up hub, together with the roller for engaging the periphery of the tape coil on such hub and the view being on an enlarged scale; and FIG. 5 a sectional view taken substantially on the line of 5—5 of FIG. 1 showing the relationship of one tape guide pin and the roller and mounting means therefor for holding the tape in engagement with such guide pin and the view being on an enlarged scale.

With continued reference to the drawing, there is shown a reversible magnetic tape cartridge constructed in accordance with this invention and which may well comprise a generally rectangular flat hollow casing 10 having a top wall 11, a bottom wall 12 and sidewalls 13 and 14 respectively abutting along a line 15 substantially midway between the top and bottom walls 11 and 12. The casing 10 may be molded from a suitable plastic or may be manufactured in any other desired manner.

Figure 2:
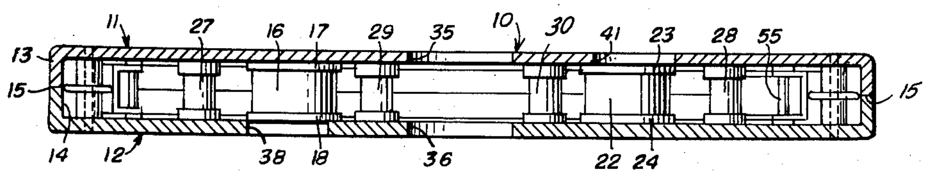
FIG. 2 is a sectional view taken substantially on the line 2—2 of FIG. 1 showing the arrangement of parts within the cartridge casing and the view being on an enlarged scale.

A hub 16 is rotatably mounted in the top and bottom walls 11 and 12 and as shown in FIG. 2, the hub 16 may be provided with upper and flower flanges 17 and 18 to properly receive a coil of magnetic tape 19. As best shown in FIG. 1, the hub 16 is provided with a bore 20 extending therethrough and such bore may be provided with splines or other suitable means 21 for engaging the feed spindle of a tape recording or play back apparatus in a manner to prevent rotation between the hub 16 and the spindle.

In a similar manner, a second or take-up hub 22 is rotatably mounted in the top and bottom walls 11 and 12 of the casing 10 and as shown in FIG. 2, the hub 22 is provided with upper and lower flanges 23 and 24 to engage a magnetic tape being wound on the hub 22. The hub 22 is provided with a bore 25 extending therethrough for receiving the take-up spindle on the recording or play back apparatus and splines or other suitable means 26 may be provided in the bore 25 for engaging the take-up spindle to prevent rotation between such spindle and the hub 22.

A guide pin 27 is secured to the top and bottom walls 11 and 12 of the casing 10 in spaced relation to the hub 16 and a second guide pin 28 is secured to the top and bottom walls 11 and 12 of the casing 10 in spaced relation to the hub 22. Spaced tape engaging guide means 29 and 30 are secured to the top and bottom walls 11 and 12 of the casing 10 between the guide pins 27 and 28 and in alignment therewith and if desired, lugs 31, 32, 33 and 34 may be provided on the casing 10 in spaced relation to the guide pins 27 and 28, as well as in spaced relation to the guide means 29 and 30 in order to maintain the magnetic tape in engagement with such guide pins and guide means. If desired, the lugs 31, 32, 33 and 34 may be molded as an integral part of the casing 10.

Aligned apertures 35 and 36 are provided in the top and bottom walls 11 and 12 respectively of the casing 10 and such apertures serve to receive a recording or play back head 37 which forms a part of the recording or play back apparatus and is positioned within the apertures 35 and 36 when the magazine of this invention is in place on the apparatus. The apertures 35 and 36 provide for reception of the head 37 with either the top wall 11 uppermost or with the bottom wall 12 uppermost when in position on the apparatus. An opening 38 is provided in the bottom wall 12 of the casing 10 between the guide pin 27 and the aligned apertures 35 and 36 and the opening 38 serves to receive the tape drive capstan 39 and pressure roller 40 when the bottom wall 12 of the casing 10 is lowermost and a second opening 41 is provided in the top wall 11 of the casing 10 to receive the capstan and pressure roller when the top wall 11 is lowermost. In other words, the capstan 39 and pressure roller 40 is selectively received in the opening 38 or opening 41 depending upon which side of the tape cartridge is uppermost when the same is in place on the recording or play back apparatus.

An arm 42 is pivotally mounted at 43 on the casing 10 and it is to be noted that the pivot 43 is between and to one side of the hub 16 and guide pin 27. Rotatably mounted on the arm 42 is a roller 44 for engaging the periphery of the tape coil 19 on the hub 16 and also pivotally mounted on the pivot 43 is a second arm 45 on which is rotatably mounted a roller 46 positioned adjacent the guide pin 27. A common resilient means, such as a suitable spring 47, is mounted on the pivot 43 with one end 48 of the spring 47 engaging the arm 42 and with the other end 49 of the spring 47 engaging the arm 45.

In a similar manner, an arm 50 is pivotally mounted at 51 on the casing 10 and a roller 52 is rotatably mounted on the arm 50 for engaging the tape coil 53 on the hub 22. An arm 54 is pivotally mounted on the same pivot 51 as the arm 50 and arm 54 serves to rotatably mount a roller 55 disposed adjacent the guide pin 28. A common resilient means, such as a spring 56 is mounted on the common pivot 51 and one end 57 of the spring 56 engages the arm 50, while the opposite end 58 of the spring 56 engages the arm 54.

In operation, a coil of tape 19 is mounted on the feed hub 16 and the tape 59 is threaded from the coil 19 around the guide pin 27 and along the guide means 29 and 30 across the apertures 35 and 36 and around the guide pin 28 to the take-up coil 53 on the hub 22. It is, of course, understood that the guide pins 27 and 28, as well as the guide means 29 and 30 are in alignment with the gap in the recording or play back head 37. The roller 46 on the arm 45 urges the tape 59 into firm engagement with the guide pin 27 thereby providing a frictional engagement and in a similar manner, the roller 55 on the arm 54 urges the tape 59 into engagement with the guide pin 28 to provide a frictional engagement therebetween. This, of course, tends to maintain the tape 59 between the guide pins 27 and 28 under a suitable tension. As the diameter of the feed coil 19 decreases, the area of contact between the tape 59 and the guide pin 27 will increase thereby increasing the friction, but at the same time, the pressure exerted by the roller 46 on the tape 59 will be decreased due to the fact that the roller 44 on the arm 42 engaging the tape coil 19 moves inwardly toward the hub 16 as the diameter of coil 19 reduces and because of the common spring means 47, the force exerted by such spring on the arm 45 will decrease as the diameter of the coil 19 becomes less. In a similar manner, as the diameter of take-up coil 53 increases, the tension or force exerted by the spring 56 on the arm 54 will increase due to the movement of the roller 52 and arm 50 and consequently, even though the area of engagement of the tape 59 with the guide pin 28 decreases as the diameter of the take-up coil 53 increases the friction between the tape and the guide pin 28 will remain substantially constant due to the variation in pressure exerted by the roller 55. As a consequence, proper tension is maintained in the tape 59 which will operate to prevent slack or the formation of loops therein, thereby maintaining such tape in proper alignment to enter within the gap of the recording or play back head 37 when the cartridge is inserted in the recording or play back apparatus.

It will be seen that by the above described invention there has been provided a relatively simple, yet highly effective mechanism for maintaining proper tension in a magnetic tape incorporated in a reversible magnetic tape cartridge and since the mechanism requires no adjustment or particular manipulation operation thereof is automatic and substantially foolproof.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A reversible magnetic tape cartridge for use on a tape recorder, said cartridge comprising a generally rectangular flat hollow casing having top and bottom walls and abutting side walls, a hub rotatably mounted in said top and bottom walls, a second hub rotatably mounted in said top and bottom walls and spaced from said first hub, each of said hubs having a bore extending therethrough for receiving the tape spindles of a tape recorder from either end, means in each bore to prevent relative rotation between each hub and the associated spindle, said first hub serving to receive a coil of tape for transfer to said second hub and thereafter from said second hub to said first hub, a guide pin secured to said top and bottom walls and spaced from said first hub, a second guide pin secured to said top and bottom walls and spaced from said second hub, said guide pins serving to engage and guide tape moving from one hub to the other, spaced tape engaging guide means between said guide pins, said top and bottom walls having aligned apertures spaced and disposed between said guide pins for receiving a recording or play back head from either side, said bottom wall having an opening between said first guide pin and said aperture, said top wall having a second opening between said second guide pin and said aperture, said openings serving to selectively receive the tape drive capstan and pressure roller of a tape recorder, oppositely extending first and second arms mounted on a common pivot to one side of and between said first hub and said first guide pin, means on said first arm for engaging the periphery of the tape coil on said first hub, a roller on said second arm for holding the tape in engagement with said first guide pin, common resilient means for urging said arms toward said first hub and said first pin, oppositely extending third and fourth arms mounted on a common pivot to one side of and between said second hub and said second guide pin, means on said third arm for engaging the periphery of the tape coil on said second hub, a second roller on said fourth arm for holding the tape in engagement with said second guide pin and a second common resilient means for urging said third and fourth arms toward said second hub and said second guide pin whereby the degree of friction between the tape and said first and second guide pins varies in proportion to the variation in diameter of the tape coils on said first and second hubs.

2. A reversible magnetic tape cartridge for use on a tape recorder, said cartridge comprising a generally rectangular flat hollow casing having top and bottom walls and abutting sidewalls, a hub rotatably mounted in said casing, a second hub rotatably mounted in said casing and spaced from said first hub, each of said hubs having a bore extending therethrough for receiving the tape spindles from a tape recorder from either end, means in each bore to prevent relative rotation between each hub and the associated spindle, said first hub serving to receive a coil of tape for transfer to said second hub and thereafter from said second hub to said first hub, a guide pin secured to said casing and spaced from said first hub, a second guide pin secured to said casing and spaced from said second hub, said guide pins serving to engage and guide tape moving from one hub to the other, spaced tape engaging guide means between said guide pins, said top and bottom walls having aligned apertures displayed between said guide pins for receiving a recording or play back head from either side, said bottom wall having an opening between said first guide pin and said aperture, said top wall having a second opening between said second guide pin and said second aperture, said openings serving to selectively receive the tape drive capstan and pressure roller of a tape recorder, oppositely extending first and second arms mounted on a common pivot to one side of and between said first hub and said first guide pin, means on said first arm for engaging the periphery of the tape coil on said first hub, a roller on said second arm for holding the tape in engagement with said first guide pin, common resilient means for urging said arms toward said first hub and said first pin, oppositely extending third and fourth arms mounted on a common pivot to one side of and between said second hub and said second guide pin, means on said third arm for engaging the periphery of the tape coil on said second hub, a second roller on said fourth arm for holding the tape in engagement with said second guide pin and a second common resilient means for uring said third and fourth arms toward said second hub and said second guide pin whereby the degree of friction between the tape and said first and second guide pins varies in proportion to the variation in diameter of the tape coils on said first and second hubs.

3. A reversible magnetic tape cartridge for use on a tape recorder, said cartridge comprising a generally rectangular flat hollow casing having top and bottom walls and abutting side walls, a hub rotatably mounted in said casing, a second hub rotatably mounted in said casing and spaced from said first hub, each of said hubs having a bore extending therethrough for receiving the tape spindles of a tape recorder from either end, means in each bore to prevent relative rotation between each hub and the associated spindle, said first hub serving to receive a coil of tape for transfer to said second hub and thereafter from said second hub to said first hub, a guide pin secured to said casing and spaced from said first hub, a second guide pin secured to said casing and spaced from said second hub, said guide pins serving to engage and guide tape moving from one hub to the other, said top and bottom walls having aligned apertures disposed between said guide pins for receiving a recording or play back head from either side, said bottom wall having an opening between said first guide pin and said aperture, said top wall having a second opening between said second guide pin and said aperture, said openings serving to selectively receive the tape drive capstan and pressure roller of a tape recorder, oppositely extending first and second arms mounted on a common pivot to one side of and between said first hub and said first guide pin, means on said first arm for engaging the periphery of the tape coil on said first hub, a roller on said second arm for holding the tape in engagement with said first guide pin, common resilient means for urging said arms toward said first hub and said first pin, oppositely extending third and fourth arms mounted on a common pivot to one side of and between said second hub and said second guide pin, means on said third arm for engaging the periphery of the tape coil on said second hub, a second roller on said fourth arm for holding the tape in engagement with said second guide pin and a second common resilient means for urging said third and fourth arms toward said second hub and said second guide pin whereby the degree of friction between the tape and said first and second guide pins varies in proportion to the variation and diameter of the tape coils on said first and second hubs.

4. A reversible magnetic tape cartridge for use on a tape recorder, said cartridge comprising a generally rectangular flat hollow casing having top and bottom walls and abutting side wall, a hub rotatably mounted in said casing, a second hub rotatably mounted in said casing and spaced from said first hub, each of said hubs having a bore extending therethrough for receiving the tape spindles of a tape recorder from either end, means in each bore to prevent relative rotation between each hub and the associated spindle, said first hub serving to receive a coil of tape for transfer to said second hub and thereafter from said second hub to said first hub, a guide pin secured to said casing and spaced from said first hub, a second guide pin secured to said casing and spaced from said second hub, said guide pins serving to engage and guide tape moving from one hub to the other, said top and bottom walls having aligned apertures disposed between said guide pins for receiving a recording or play back head from either side, said bottom wall having an opening between said first guide pin and said aperture, said top wall having a second opening between said second guide pin and said aperture, said openings serving to selectively receive the tape drive capstan and pressure roller of a tape recorder, oppositely extending first and second arms pivotally mounted to one side of and between said first hub and said first guide pin, means on said first arm for engaging the periphery of the tape coil on said first hub, a roller on said second arm for holding the tape in engagement with said first guide pin, common resilient means for urging said arms toward said first hub and said first pin, oppositely extending third and fourth arms pivotally mounted to one side of and between said second hub and said second guide pin, means on said third arm for engaging the periphery of the tape coil on said second hub, a second roller on said fourth arm for holding the tape in engagement with said second guide pin and a second common resilient means for urging said third and fourth arms toward said second hub and said second guide pin whereby the degree of friction between the tape and said first and second guide pins varies in proportion to the variation in diameter of the tape coils on said first and second hubs.

References Cited in the file of this patent

UNITED STATES PATENTS 2,353,044 Kriegsheim ---------------- July 4, 1944

FOREIGN PATENTS 851,826 Great Britain ------------ Oct. 19, 1960